July 4, 1950

T. T. ARDEN 2,513,705

SAFETY AND CONDITION CONTROL DEVICE
FOR GASEOUS FUEL BURNERS

Filed Nov. 4, 1947

INVENTOR.
Thomas T. Arden.
BY
HIS ATTORNEY

Patented July 4, 1950

2,513,705

UNITED STATES PATENT OFFICE 2,513,705

SAFETY AND CONDITION CONTROL DEVICE FOR GASEOUS FUEL BURNERS

Thomas T. Arden, La Habra, Calif., assignor to Robertshaw-Fulton Controls Company, Youngwood, Pa., a corporation of Delaware Application November 4, 1947, Serial No. 784,050

7 Claims. (Cl. 158—117.1)

This invention relates to control devices for gaseous fuel burners and, more particularly, to thermoelectric safety controls for large capacity burners with or without regulation of the burner according to a condition caused by operation thereof.

Various controls of the type described are being marketed for use on small capacity gas burning equipment such as domestic single family water heaters. These controls usually embody a main fuel cock controlling flow of fuel to main and pilot burners together with a thermoelectric safety device for shutting off the flow to both burners upon extinguishment of the pilot burner. Devices of this general type are disclosed in Patent Nos. Re. 22,511, 2,319,685, 2,361,944 and 2,361,945 among others. However, industrial and apartment water heaters and central warm air and hot water space heating units require safety controls with ratings in excess of these for which these patented devices were intended. The rating of such equipment varies over a wide range and the quantities are relatively small. Consequently, it is not feasible to meet the need by providing specially modified safety pilots on existing devices, particularly to the detriment of normal safe lighting practice.

An object of this invention is to adapt a thermoelectric safety control, such as used on small capacity equipment, for use on large capacity equipment with a minimum of alteration and no sacrifice of existing advantages.

Another object of the invention is to utilize a standard commercial form of fuel controlling device in conjunction with the safety control apparatus for securing the desired capacity of fuel flow to both main and pilot burners irrespective of widely varying requirements.

Another object of the invention is to incorporate the so-called 100 per cent shut-off of fuel when the safety control operates.

Another object of the invention is to adapt the safety control device for operation also under thermostatic or other condition control without extensive alteration or detracting from its primary safety control function.

Other objects and advantages will become apparent from the following description taken in connection with the accompanying drawing, wherein.

Figure 1:
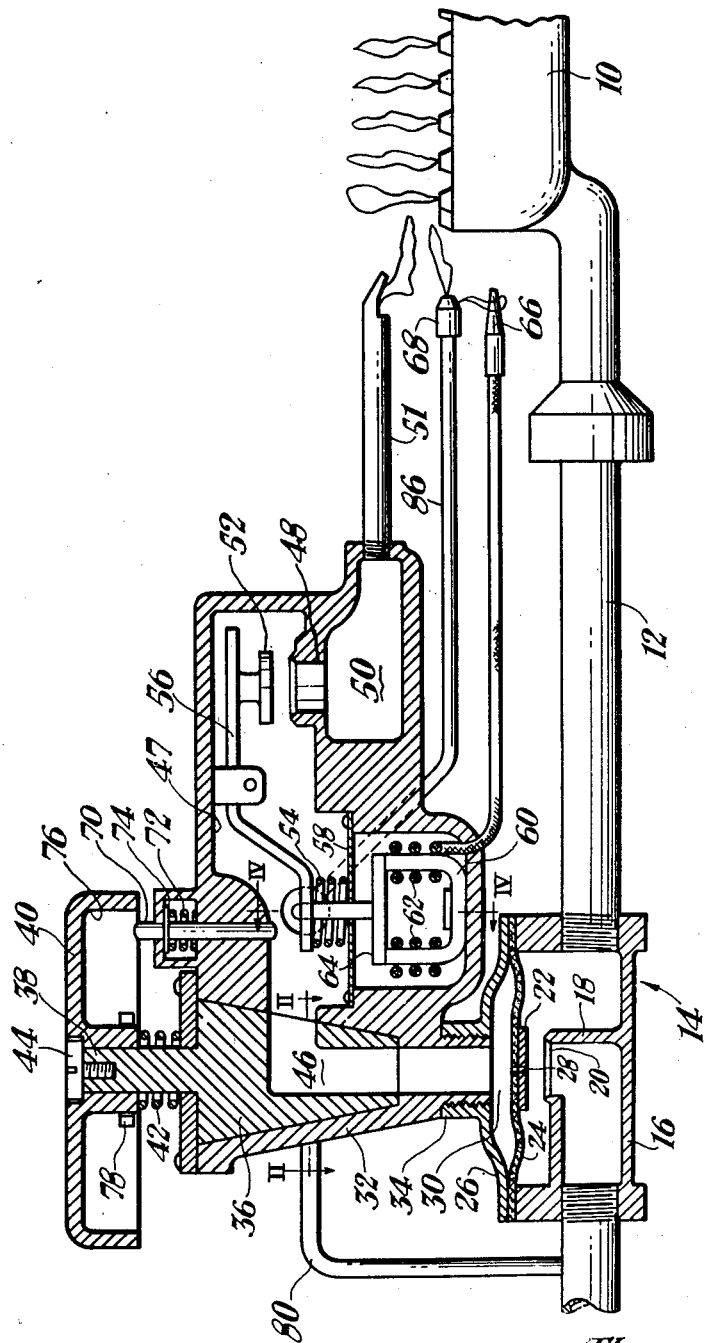
Fig. 1 is a schematic view of the safety control device forming the subject matter of this invention shown in conjunction with a gaseous fuel burner.
Figure 2:
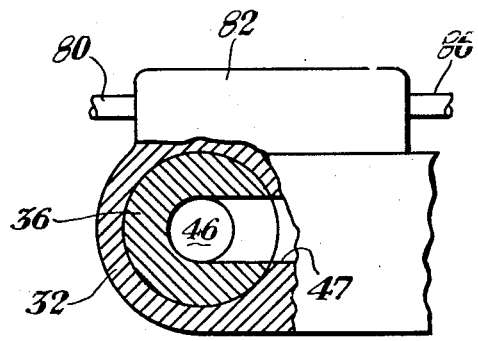
Fig. 2 is a section taken on the line II—II of Fig. 1.

Referring more particularly to the drawing, a main burner 10 is shown for location in a water heater, warm air furnace or some other conventional heating device (not shown). The burner 10 is supplied with gaseous fuel through a pipe 12 in which the fuel supply is controlled by a main fuel valve designated generally by the reference numeral 14.

The main fuel valve 14 comprises a valve casing 16 providing a valve chamber to which the inlet and outlet portions of the main fuel pipe 12 are connected. A partition 18 formed intermediate the inlet and outlet provides a port 20 controlled by a valve member 22. A flexible diaphragm element 24 is secured to the valve member 22 and has its outer portion secured to the casing 16 in sealing relation therewith by a bonnet 26. The valve member 22 and diaphragm 24 are apertured to provide a bleed connection 28 serving as a passage for fuel from the casing 16 into an auxiliary passage 30 in the bonnet 26.

The control device of this invention is modified only slightly from those disclosed in the foregoing patents and only the essential portions thereof need be described and shown schematically herein. Thus, the control casing 32 of the safety control device is shown as of elongated form and secured at one end directly to the bonnet 26 as at 34 but it will be understood that piping or other connecting means could be employed therebetween. The control casing 32 is suitably apertured at the same end to receive a tapered shutoff cock 36 having a projecting stem 38 by which the cock 36 may be rotated. A knob or handle 40 is non-rotatably secured to the stem 38 but is adapted for limited axial movement in one direction relative thereto by the provision of a coil spring 42 located between the knob 40 and the casing 32. A screw 44 is mounted on the stem 38 with its head overlying the knob 40 to limit separating movement in the opposite direction between the knob 40 and the stem 38.

The shutoff cock has an angular port 46 which communicates at one end with the auxiliary passage 30 and at the other end with a fuel passage 47 formed by the interior of the control casing 32 when the cock is in the position shown in Fig. 1 of the drawing. The casing 32 is provided at the opposite end with a partition 48 having an opening therethrough for communication between the passage 47 and an outlet chamber 50 with which an auxiliary burner 51 is adapted to communicate by its attachment to the casing 32 at this location. It is apparent, therefore, that the auxiliary passage 30, the interior fuel passage 47 of the the casing 32 and the chamber 50 therein form a continuation of the bleed connection 28 for supplying the auxiliary burner 51 but only when the shutoff cock 36 is not rotated to a position to interrupt this connection. However, control means in the form of a safety control valve 52 is cooperable with the opening in the partition 48 to control the flow of fuel in the described bleed connection.

The control valve 52 is carried on one end of a lever 56 and is biased to a closed position relative to the opening in partition 48 by a coil spring 54 at the opposite end of the lever 56 serving to pivot the lever 56 in a clockwise direction. The coil spring 54 is mounted on a closure plate 58 for a magnet chamber formed in the casing 32 and in which electromagnetic means comprising a horseshoe magnet 60 and its associated winding 62 and armature 64 are housed. The armature 64 is connected to the lever 56 so that when the bias of the coil spring 54 is overcome and the valve member 52 is open, then the armature 64 will be in attracted position relative to the pole faces of the magnet 60. On the other hand, when the bias of the coil spring 54 is effective, then the armature 64 will assume a released position and the valve member 52 will be closed.

The winding 62 and magnet 60 are energized by a thermoelectric device shown as a thermocouple 66 exposed to a flame from a pilot burner 68. The current generated by the thermocouple 66 is generally insufficient to attract the armature 64 but is capable of retaining it in attracted position after it has been reset to such position. Consequently, manually operable resetting means in the form of a plunger 70 is mounted in the casing 32 overlying the end of the lever 56 which carries the armature 64. The plunger 70 is biased outwardly of the casing 32 by a coil spring 72 and such action is limited by a collar 74 on the plunger 70 which cooperates with a portion of the casing 32 for this purpose. The exterior end of the plunger 70 enters an annular recess 76 in the knob 40 and is adapted to be engaged during rotation thereof by an arcuate cam element 78 formed within the recess 76.

Figure 3:
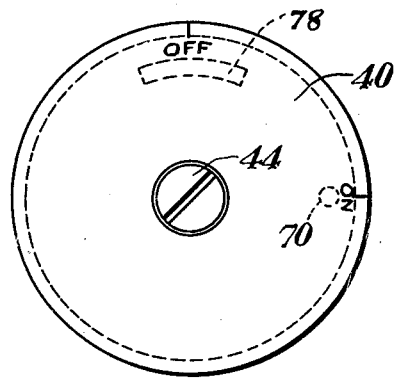
Fig. 3 is a plan view of the operating knob or handle.

As will be apparent from Fig. 3 of the drawing, the cam element 78 extends for a short distance on either side of a position indicated "Off" on the face of the knob 40. Spaced approximately ninety degrees from the "Off" position is a position indicated "On." The "Off" and "On" positions are so related to the port 46 that the cam element 78 overlies the plunger 70 only when the shutoff cock 36 is in the "Off" position and consequently the resetting operation can be conducted only in this position of the cock 36.

Figure 4:
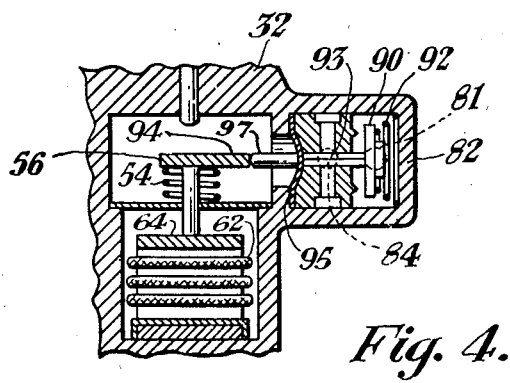
Fig. 4 is a section taken on the line IV—IV of Fig. 1.

The pilot burner 68 is supplied with fuel from a conduit 80 connected at one end to the inlet side of the main valve 14 and at the opposite end to an inlet 81 of a pilot valve casing 82 carried by the main casing 32 and shown more clearly in Fig. 4. Passage of fuel from the conduit 80 is controlled by a pilot control valve member 90 operable within the casing 82 and being biased to a closed position by a coil spring 92. The valve member 90 has a non-circular stem 93 operatively engaging one side of a sealing diaphragm 95 which provides for non-communication between the casings 32 and 82.

An abutment 94 formed on the lever 56 is adapted to engage a projection 97 on the opposite side of the diaphragm 95 and overcome the bias of the coil spring 92 when operative relationship between the parts is established. Passage for fuel is then provided from inlet 81 along the stem 93 to an outlet 84 in the casing 82. Such operative relationship occurs when the lever 56 is in position with the armature 64 seated on the pole faces of the magnet 60. This condition therefore obtains both during the resetting operation and during normal running conditions at the main burner 10. When the pilot control valve member 90 is unseated communication is established between conduit 80 and a conduit 86 which has one end connected to the outlet 84 and the opposite end connected to the pilot burner 68.

In order to bring the apparatus into the normal running condition shown in the drawing, it may be assumed that the operation is to be conducted when the knob 40 is in the "Off" position and the fuel pressure on opposite sides of the diaphragm 24 of the main fuel valve is substantially balanced. Under such conditions, the main fuel valve 14 will be closed due to the valve member 22 by its own weight biasing the valve to a closed position to cut off the flow of fuel to the main burner 10. The safety control valve member 52 will also be closed under bias of the coil spring 54 as the thermocouple 66 is unheated by a flame at the pilot burner 68 and the electromagnetic device 60, 62 is deenergized.

Fuel is thus permitted to flow through the conduit 80 as far as the pilot control valve member 90 which is biased to closed position at this time. The knob 40 is then depressed and the cam element 78 operatively engages the plunger 70 in the resetting operation serving to rotate the lever 56 in a counterclockwise direction, as viewed in Fig. 1 of the drawing. The armature 64 is placed in attracted position relative to the pole faces of the magnet 60. The safety control valve member 52 is opened and the abutment 94 opens the pilot control valve member 90. Hence, while fuel is permitted to flow through the conduit 86 to the pilot burner 68 where it can be ignited, there is no flow to the auxiliary burner 51 as the cock 36 is still in the "Off" position.

After sufficient time has elapsed for the thermocouple 66 to become heated, the knob 40 may be released and the armature 64 will remain in attracted position and the valve members 52 and 90 in open position. Upon rotation of the knob 40 to the "On" position and consequent registry of port 46 with interior passage 47, flow of fuel through the bleed connection 28, auxiliary passage 30, port 46, passage 47, chamber 50 and auxiliary burner 51 is established while fuel continues to flow through the bypass connection of conduit 80 and conduit 86 to the pilot burner 68. The auxiliary burner 51 becomes ignited by the flame at the pilot burner 68 and the fuel pressure on the side of the diaphragm 24 adjacent the auxiliary passage 30 is reduced. The pressure differential in the main valve 14 is sufficient to cause this valve to open and allow fuel to flow to the main burner 10 where it is ignited by the flame from the auxiliary and pilot burners.

In the event that the flame of the pilot burner 68 is extinguished, then the thermocouple 66 will cool and the magnet 60 becomes deenergized to release the armature 64. Rotation of the lever 56 in a clockwise direction under bias of the coil spring 54 will cause the valve members 52 and 90 to close. The flow of fuel by way of the bleed connection to the auxiliary burner 51 will be cut-off and fuel pressure will build up in the auxiliary passage 30 on one side of the diaphragm 24 sufficiently for causing the main fuel valve 14 to close. Thus, flow of fuel to all of the burners is cut-off as soon as the flame at the pilot burner 68 is extinguished.

Figure 5:
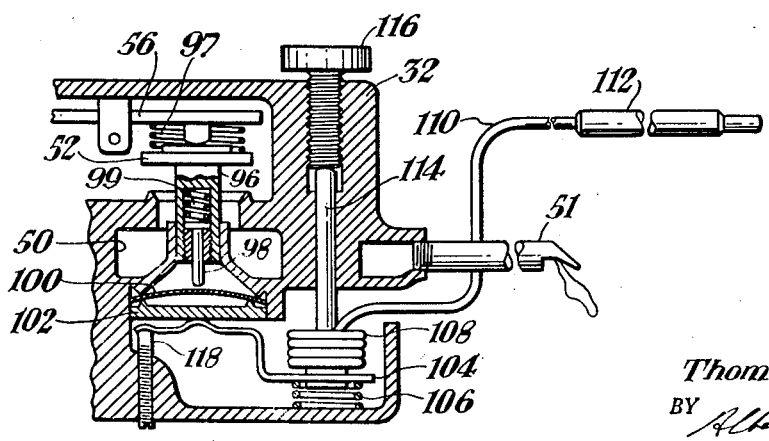
Fig. 5 is a schematic view, partly in section, of a modified form of control device incorporating thermostatic control.

In the modification illustrated in Fig. 5 of the drawings the control valve 52 is arranged for thermostatic operation in response to a temperature condition requiring operation of the main burner 10 for opening the control valve 52. To this end, the valve member 52 is provided with a depending hollow stem 96 which is operatively engageable through an override connection comprising plunger 98 and coil spring 99 by a snap disc 100. A thrust element 102 operates the snap disc 100 upon axial movement imparted by an operating lever 104 having operative engagement therewith. The opposite end of the lever 104 is operable by a thermostatic device and, to this end, is biased by a coil spring 106 into operative engagement with a bellows element 108. The bellows element 108 is connected by a capillary tube 110 to a bulb element 112. The thermostatic device is filled with a thermally expansible liquid which is adapted to be subjected to the temperature of the fluid being heated by the main burner 10 by locating the bulb element 112 therein. A rod 114 projects from the bellows element 108 through the casing 32 for engagement by an adjusting screw 116 which projects exteriorly of the casing 32. An initial adjustment of the thermostatic device is obtained by provision of a second adjusting screw 118 which projects into the casing 32 for operative engagement with the end of the lever 104 opposite that engaged by the bellows element 108. As the remaining parts of the control mechanism may be identical with those previously disclosed herein, further description is deemed unnecessary.

In the operation of the embodiment shown in Fig. 5 the sequence of steps to place the main burner 10 in operation is similar to that previously described. However, the control valve member 52 being unattached to the lever 56 is not opened by the counterclockwise rotation of this lever when the armature 64 is reset. Consequently, fuel does not flow to the auxiliary burner 51 when the cock 36 is in the "On" position unless the temperature sensed by the bulb element 112 is below that for which the adjusting screw 116 is set. In such event, the bellows element 108 is contracted and the lever 104 will be rotated counterclockwise under bias of the spring 106 to cause axial movement of the thrust element 102 and snap-action operation of the valve member 52 to open position. Such operation will open the bleed connection as described for reducing the fuel pressure on the side of the diaphragm 24 adjacent the auxiliary passage 30 whereupon both the auxiliary burner 51 and the main burner 10 will be ignited.

When the temperature condition at the bulb element 112 reaches that for which the adjusting screw 116 has been set, the bellows will expand and cause snap-action movement of the snap disc 100 in the opposite direction. The valve member 52 will thereupon close under bias of the coil spring 97 thus interrupting the flow of fuel through the bleed connection and establishing a substantially balanced pressure on opposite sides of the diaphragm 24 sufficient to cause the main valve 14 to close. Upon cooling of the fluid to which the bulb 112 is sensitive, the control valve 52 will again be opened with snap-action to produce the unbalanced or differential pressure on opposite sides of the diaphragm 24 causing the main burner 10 to again be placed in operation.

In the event that the flame at the pilot burner 68 is extinguished while the control valve 52 is closed, then the lever 56 is rotated in a clockwise direction by release of the armature 64 causing closure of the pilot control valve 90. The flow of fuel to the auxiliary and main burners 51 and 10 has already ceased as the control valve 52 is closed. However, should the flame at the pilot burner 68 become extinguished while the control valve member 52 is open, then the bias of the coil spring 54 which is greater than that of the coil spring 99 will serve to cause closure of this control valve member 52 by compressing the coil spring 99. The override connection between the snap disc 100 and the valve member 52 serves to prevent damage to the parts during this safety operation.

It will be understood that many changes may be made in the details of construction and arrangement of parts without departing from the scope of the invention so that this description and accompanying drawings are intended by way of illustration only and are not to be construed in a limiting sense.

I claim:

1. A control apparatus for fluid fuel burners having main, auxiliary and pilot burners, comprising a differential pressure operated main valve for controlling flow of fuel to the main burner, means adapted to form a bleed connection for supplying fuel from said main valve to the auxiliary burner, a connection for by-passing said main valve and supplying fuel to the pilot burner, control valve means operable for controlling the flow of fuel to said auxiliary and pilot burners, means operable for biasing said control valve means to a closed position, manually operable means having a first position for closing said bleed connection and establishing said by-passing connection, means operatively associated with said manually operable means in said first position for overcoming said biasing means, and means responsive to the presence of a flame at the pilot burner for retaining said biasing means in an inoperative position, said manually operable means having a second position for opening said bleed connection for producing a pressure differential in said main valve sufficient for causing said main valve to open.

2. A control appartus for fluid fuel burners having main, auxiliary and pilot burners, comprising a differential pressure operated main valve for controlling flow of fuel to a main burner, means adapted to form a bleed connection for supplying fuel from said main valve to the auxiliary burner, a connection for by-passing said main valve and supplying fuel to the pilot burner, control valve means operable for controlling the flow of fuel to said auxiliary and pilot burners, means operable for biasing said control valve means to a closed position, a rotary shut-off cock having a first position for closing said bleed connection and establishing said by-passing connection, means operatively associated with said shut-off cock in said first position for overcoming said biasing means, thermoelectric means responsive to the presence of a flame at the pilot burner, and electromagnetic means energized by said thermoelectric means for retaining said biasing means in an inoperative position, said shut-off cock having a second position for opening said bleed connection for producing a pressure differential in said main valve sufficient for causing said main valve to open.

3. A control apparatus for fluid fuel burners having main, auxiliary and pilot burners, comprising a main valve casing having a main passage for supplying fuel to the main burner and an auxiliary passage communicating with said main passage, a main valve member biased to a closed position in said casing for controlling said main passage and having a bleed connection with said auxiliary passage for supplying fuel to the auxiliary burner, said main valve member including actuating means subject to differences in fuel pressure on opposite sides thereof for moving said main valve member to open position, a connection for by-passing said main valve member and supplying fuel to the pilot burner, control valve means operable for controlling the flow of fuel to said auxiliary and pilot burners, means for biasing said control valve means to a closed position for closing said bleed connection and producing substantially balanced pressures on opposite sides of said actuating means, a rotary shut-off cock having a first position for closing said bleed connection and establishing said by-passing connection, means operatively associated with said shut-off cock in said first position for overcoming said biasing means, and means responsive to the presence of a flame at the pilot burner for retaining said biasing means in an inoperative position, said shut-off cock having a second position for opening said bleed connection for reducing the fuel pressure on one side of said actuating means and causing movement of said main valve member to open position.

4. A control apparatus for fluid fuel burners having main, auxiliary and pilot burners, comprising a main valve casing having a main passage for supplying fuel to the main burner and an auxiliary passage communicating with said main passage, a main valve member biased to a closed position in said casing for controlling said main passage and having a bleed connection with said auxiliary passage for supplying fuel to the auxiliary burner, said main valve member including a flexible diaphragm subject to differences in fuel pressure on opposite sides thereof for moving said main valve member to open position, a connection for by-passing said main valve member and supplying fuel to the pilot burner, control valve means operable for controlling the flow of fuel to said auxiliary and pilot burners and having a closed position for closing said bleed connection and producing substantially balanced pressures on opposite sides of said diaphragm, a rotary shut-off cock interposed between said main valve member and said control valve means and having port means adapted for non-communication with said bleed connection when said cock is in a first position, thermoelectric means located to be heated by a flame at the pilot burner, electromagnetic means connected to said control valve means and adapted for energization by said thermoelectric means and being biased to an inoperative position, and reset means operatively associated with shut-off cock in said first position for resetting said electromagnetic means to an operative position for movement of said control valve means to an open position, said shut-off cock having a second position in which said port means communicates with said bleed connection for reducing the fuel pressure on one side of said diaphragm and causing movement of said main valve member to open position.

5. A control apparatus for a fluid fuel burner comprising a burner, a main valve casing having a main passage for supplying fuel to the burner and an auxiliary passage communicating with said main passage, a main valve member in said casing for controlling said main passage and having a bleed connection with said auxiliary passage, said valve member being operable to open position upon sufficient variation in fuel pressure on opposite sides thereof, a control device for said bleed connection, first means operable in response to a condition caused by the absence of combustion at the burner for positioning said control device to produce said variation in fuel pressures on opposite sides of said valve member, and second means operable in response to another condition caused by said absence of combustion for overcoming said first means and positioning said control device to produce substantially balanced pressures on opposite sides of said valve member.

6. A control apparatus for a fluid fuel burner comprising a burner, a main valve casing having a main passage for supplying fuel to the burner and an auxiliary passage communicating with said main passage, a main valve member in said casing for controlling said main passage and having a bleed connection with said auxiliary passage, said valve member being operable to open position upon sufficient variation in fuel pressure on opposite sides thereof, control valve means for opening and closing said bleed connection and being biased to said closing position, manually operable means for freeing said control valve means for an opening operation to produce a variation in the fuel pressure on one side of said main valve member, means responsive to the presence of a flame at the burner for retaining said control valve means in said free condition, and means responsive to temperature variations caused by operation of the burner for positioning said control valve means for opening said bleed connection.

7. A control apparatus for a fluid fuel burner having main, auxiliary and pilot burners, comprising a main valve casing having a main passage for supplying fuel to the main burner and an auxiliary passage communicating with said main passage, a main valve member biased to a closed position in said casing for controlling said main passage and having a bleed connection with said auxiliary passage for supplying fuel to the auxiliary burner, said main valve member including a flexible diaphragm subject to differences in fuel pressure on opposite sides thereof for moving said main valve member to open position, a connection for by-passing said main valve member and supplying fuel to the pilot burner, control valve means operable for controlling the flow of fuel to said auxiliary and pilot burners, means for biasing said control valve means to a closed position for closing said bleed connection and producing substantially balanced pressures on opposite sides of said diaphragm, a rotary shut-off cock having a first position for closing said bleed connection, means operatively associated with said shut-off cock in said first position for overcoming said biasing means and freeing said control valve means for movement to open position, means responsive to the presence of a flame at the pilot burner for retaining said biasing means in an inoperative position, said shut-off cock having a second position for opening said bleed connection for reducing the fuel pressure on one side of said diaphragm when said control valve means is opened, and thermostatic means responsive to a temperature condition requiring operation of the main burner for opening said control valve means and causing movement of said main valve member to open position.

THOMAS T. ARDEN.

REFERENCES CITED

The following references are of record in the file of this patent:

UNITED STATES PATENTS

| Number | Name | Date |
| --- | --- | --- |
| 2,363,073 | Mantz | Nov. 21, 1944 |
| 2,390,172 | Ray | Dec. 4, 1945 |
| 2,437,894 | Ray | Mar. 16, 1948 |